US 6,532,509 B1

(12) United States Patent
Wolrich et al.

(10) Patent No.: US 6,532,509 B1
(45) Date of Patent: Mar. 11, 2003

(54) ARBITRATING COMMAND REQUESTS IN A PARALLEL MULTI-THREADED PROCESSING SYSTEM

(75) Inventors: Gilbert Wolrich, Framingham, MA (US); Debra Bernstein, Sudbury, MA (US); Matthew J. Adiletta, Worcester, MA (US); William Wheeler, Southborough, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/470,541

(22) Filed: Dec. 22, 1999

(51) Int. Cl.⁷ .............................................. G06F 13/14
(52) U.S. Cl. .......................... 710/240; 710/52; 709/104
(58) Field of Search .................... 710/240–244, 710/200, 40, 107, 52, 20, 7, 105, 313; 709/231, 200, 201, 217, 104; 711/150, 151, 148; 712/32, 36; 370/464

(56) References Cited

U.S. PATENT DOCUMENTS

| | | | |
|---|---|---|---|
| 5,155,854 A | * | 10/1992 | Flynn et al. |
| 5,263,169 A | * | 11/1993 | Genusov et al. |
| 5,367,678 A | * | 11/1994 | Lee et al. |
| 6,014,729 A | * | 1/2000 | Lannan et al. |
| 6,347,344 B1 | * | 2/2002 | Baker et al. |

* cited by examiner

Primary Examiner—Gopal C. Ray
(74) Attorney, Agent, or Firm—Fish & Richardson P.C.

(57) ABSTRACT

A parallel, multi-threaded processor system and technique for arbitrating command requests is described. The system includes a plurality of microengines, a plurality of shared system resources and a global command arbiter. The global command arbiter uses a command request protocol that is based on the shared system resources and command type to grant or deny a microengine command request for a shared resource.

35 Claims, 4 Drawing Sheets

ARBITRATING COMMAND REQUESTS IN A PARALLEL MULTI-THREADED PROCESSING SYSTEM

BACKGROUND OF THE INVENTION

This invention relates to a protocol for providing parallel, multi-threaded processors with high bandwidth access to shared resources.

Parallel processing is an efficient form of computer information processing of concurrent events. Certain problems may be solved by applying parallel computer processing, which demands concurrent execution of many programs to do more than one thing at the same time. Unlike a serial paradigm where all tasks are performed sequentially at a single station, or a pipelined machine where tasks are performed at specialized stations, parallel processing requires that a plurality of stations have the capability to perform all tasks. In general, all or a plurality of the stations work simultaneously and independently on the same or common elements of a problem.

Types of computer processing include single instruction stream, single data stream, which is the conventional serial von Neumann computer that includes a single stream of instructions. A second processing type is the single instruction stream, multiple data streams process (SIMD). This processing scheme may include multiple arithmetic-logic processors and a single control processor. Each of the arithmetic-logic processors performs operations on the data in lock step and are synchronized by the control processor. A third type is multiple instruction streams, single data stream (MISD) processing which involves processing the same data stream flows through a linear array of processors executing different instruction streams. A fourth processing type is multiple instruction streams, multiple data streams (MIMD) processing which uses multiple processors, each executing its own instruction stream to process a data stream fed to each of the processors. MIMD processors may have several instruction processing units and therefore several data streams.

SUMMARY OF THE INVENTION

According to-an aspect of the present invention, a parallel, hardware-based, multi-threaded processor includes a global command arbiter for determining the allocation of access to system resources. The multi-threaded processor system includes a plurality of microengines, a plurality of shared system resources and a global command arbiter. The global command arbiter uses a command request protocol based on the shared system resources and command type to grant or deny a microengine command request for a shared resource. The processor system may be advantageously realized on an integrated circuit chip with minimal wiring and buffer storage elements.

The technique according to the invention provides each microengine with fair access to the shared system resources based on command priority and resource utilization. Consequently, the microengines have high bandwidth access to the shared system resources.

DESCRIPTION

Figure 1:
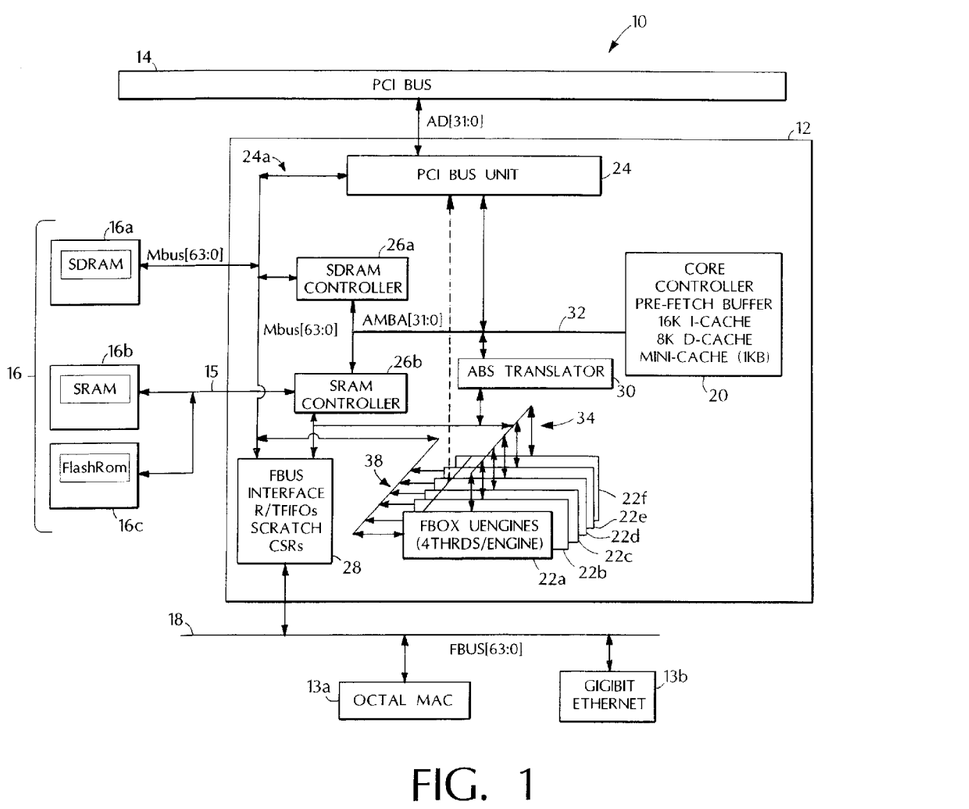
FIG. 1 is a block diagram of a communication system employing a hardware-based multithreaded processor.

FIG. 1 illustrates a communication system 10 that includes a parallel, hardware-based multithreaded processor 12. The system 10 is especially-useful for tasks that can be broken intoparallel subtasks or functions, and the hardware-based multithreaded processor 12 is particularly useful for tasks that are bandwidth oriented rather than latency oriented.

The hardware-based multithreaded processor 12 may be an integrated circuit, and may be coupled to a bus such as a PCI bus 14, a memory system 16 and a second bus 18. In the illustrated implementation, the hardware-based multi-threaded processor 12 has multiple microengines 22a to 22f that each includes multiple hardware-controlled threads that can be simultaneously active and that may independently work on a task. The multithreaded processor 12 also includes a central or core controller 20 that assists in loading microcode control for other resources and-performs other general purpose computer-type functions such as handling protocols, handling exceptions, and providing extra support for packet processing, which may occur if the microengines pass the packets off for more detailed processing. In one embodiment, the core controller 20 is a Strong Arm® (Arm is a trademark of ARM Limited, United Kingdom) based architecture embedded general-purpose microprocessor, which includes an operating system. The operating system enables the core processor 20 to call functions to operate on the microengines 22a–22f. The core processor 20 can use any supported operating system but preferably utilizes a real time operating system. Suitable operating systems for a core processor implemented as a Strong Arm architecture microprocessor may include Microsoft NT real-time, VXWorks and μCUS, which is a freeware operating system available over the Internet.

The plurality of functional microengines 22a–22f each maintain a plurality of program counters in hardware, and maintain states associated with the program counters. Each of the six microengines 22a–22f is capable of processing four independent hardware threads. Such processing allows one thread to start executing just after another thread issues a memory reference and then waits until that reference completes before doing more work. This behavior is critical to maintaining efficient hardware execution of the microengines because memory latency may be significant. Stated differently, if only a single thread execution was supported, the microengines would sit idle for a significant number of cycles waiting for references to return and thereby reduce overall computational throughput. Multi-threaded execution allows the microengines to mask memory latency by performing useful independent work across several threads. Effectively, a corresponding plurality of sets of threads can be simultaneously active on each of the microengines 22a–22f while only one is actually operating at any one time.

The six microengines 22a–22f operate with shared system resources including the memory system 16, the PCI bus 14 and the FBUS 18. The memory system 16 may be accessed via a Synchronous Dynamic Random Access Memory (SDRAM) controller 26a and a Static Random Access Memory (SRAM) controller 26b. SDRAM memory 16a and SDRAM controller 26a may-be typically used for processing large volumes of data or high bandwidth data, such as processing network payloads from network packets. The SRAM controller 26b and SRAM memory 16b may be used in a networking implementation for low latency, fast access tasks or low bandwidth data, such as accessing look-up tables, memory for the core processor 20, and so forth.

The six microengines 22a–22f access either the SDRAM 16a or SRAM 16b based on characteristics of the data. Low latency, low bandwidth data is stored in and fetched from SRAM 16b, whereas higher bandwidth data for which latency is not as important is stored in and fetched from SDRAM 16a. The microengines 22a–22f can execute memory reference instructions to either the SDRAM controller 26a or SRAM controller 26b.

Advantages of hardware multithreading can be explained in the context of SRAM or SDRAM memory accesses. For example, an SRAM access requested by a Thread_0 from a microengine will cause the SRAM controller 26b to initiate an access to the SRAM memory 16b. The SRAM controller 26b controls arbitration for the SRAM bus 15, accesses the SRAM 16b, fetches the data from the SRAM 16b, and returns data to a requesting microengine 22a–22b. During a SRAM access, if the microengine 22a had only a single thread that could operate, that microengine would be dormant until data was returned from the SRAM. By employing hardware context swapping within each of the microengines 22a–22f, another thread such as Thread_1 can function while the first thread, Thread_0 is awaiting the read data to return. Hardware context swapping enables other contexts with unique program counters to execute in that same microengine. Continuing the example, during execution Thread_1 may access the SDRAM memory 16a. While Thread_1 operates on the SDRAM unit, and Thread_0 is operating on the SRAM unit, a new thread such as Thread_2 can now operate in the microengine 22a. Thread_2 can operate for a certain amount of time until it needs to access memory or perform some other long latency operation, such as making an access to a bus interface. Therefore, the processor 12 can simultaneously perform a bus operation, SRAM operation and SDRAM operation with all being completed or operated upon by one microengine 22a, which microengine 22a has one more thread available to process more work in the data path.

The hardware context swapping also synchronizes completion of tasks. For example, it is possible that two threads could hit the same-shared resource such as the SRAM 16b. Each one of the separate functional units, such as the interface 28, the SRAM controller 26a, and the SDRAM controller 26b, reports back a flag signaling completion of an operation when a requested task from one of the microengine thread contexts is completed. When the flag is received by the microengine, the microengine can determine which thread to turn on.

The processor 12 includes a bus interface 28 that couples the processor to a second bus 18. In an implementation, an FBUS interface 28 couples the processor 12 to the so-called FBUS 18 (FIFO bus). The F BUS is a 64-bit wide FIFO bus, used to interface to Media Access Controller (MAC) devices. The FBUS interface 28 is responsible for controlling and interfacing the processor 12 to the FBUS 18.

The processor 12 also includes a PCI bus interface 24 that couples other system components that reside on the PCI bus 14 to the processor 12. The PCI bus interface 24 also provides a high-speed data path 24a to the SDRAM memory 16a. The data path 24a permits data to be moved quickly from the SDRAM 16a to the PCI bus 14, via direct memory access (DMA) transfers. The hardware based multithreaded processor 12 can employ a plurality of DMA channels so if one target of a DMA transfer is busy, another one of the DMA channels can take over the PCI bus 14 to deliver information to another target to maintain high processor 12 efficiency. The PCI bus interface 24 supports image transfers, target operations and master operations. Target operations are operations where slave devices on bus 14 access the SDRAM through reads and writes that are serviced as a slave to target operation. In master operations, the processor core 20 sends data directly to or receives data directly from the PCI interface 24.

Each of the functional units of the processor 12 are coupled to one or more internal buses. In an implementation, the internal buses are dual 32-bit buses (i.e., one bus for read and one for write). The multithreaded processor 12 also is constructed such that the sum of the bandwidths of the internal buses exceeds the bandwidth of external buses coupled to the processor 12. The internal core processor bus 32 may be an Advanced System Bus (ASB bus) that couples the processor core 20 to the memory controllers 26a and 26b and to an ASB translator 30. The ASB bus is a subset of an "AMBA" bus that is used with the Strong Arm processor core. The processor 12 also includes a private bus 34 that couples the microengine units to SRAM controller 26b, ASB translator 30 and FBUS interface 28. A memory bus 38.couples the SDRAM controller 26a, the PCI bus interface 24, the FBUS interface 28 and memory system 16 together, including Flash ROM 16c which is used-for boot operations and the like.

The hardware-based multithreaded processor 12 may be utilized as a network processor. As a network processor, the hardware-based multithreaded processor 12 interfaces to network devices such as a media access controller (MAC) device such as a 10/100 BaseT Octal MAC 13a or a Gigabit Ethernet device 13b. In general, the hardware-based multi-threaded processor 12 can interface to any type of communication device or interface that receives/sends large amount of data. The communication system 10 functioning in a networking application could receive a plurality of network packets from the devices 13a, 13b and process each of those packets independently in a parallel manner.

The processor 12 may also be utilized as a print engine for a postscript processor, as a processor for a storage subsystem such as RAID disk storage, or as a matching engine. In the securities industry for example, the advent of electronic trading requires the use of electronic matching engines to match orders between buyers and sellers. These and other parallel types of tasks can be accomplished on the system 10.

Figure 2:
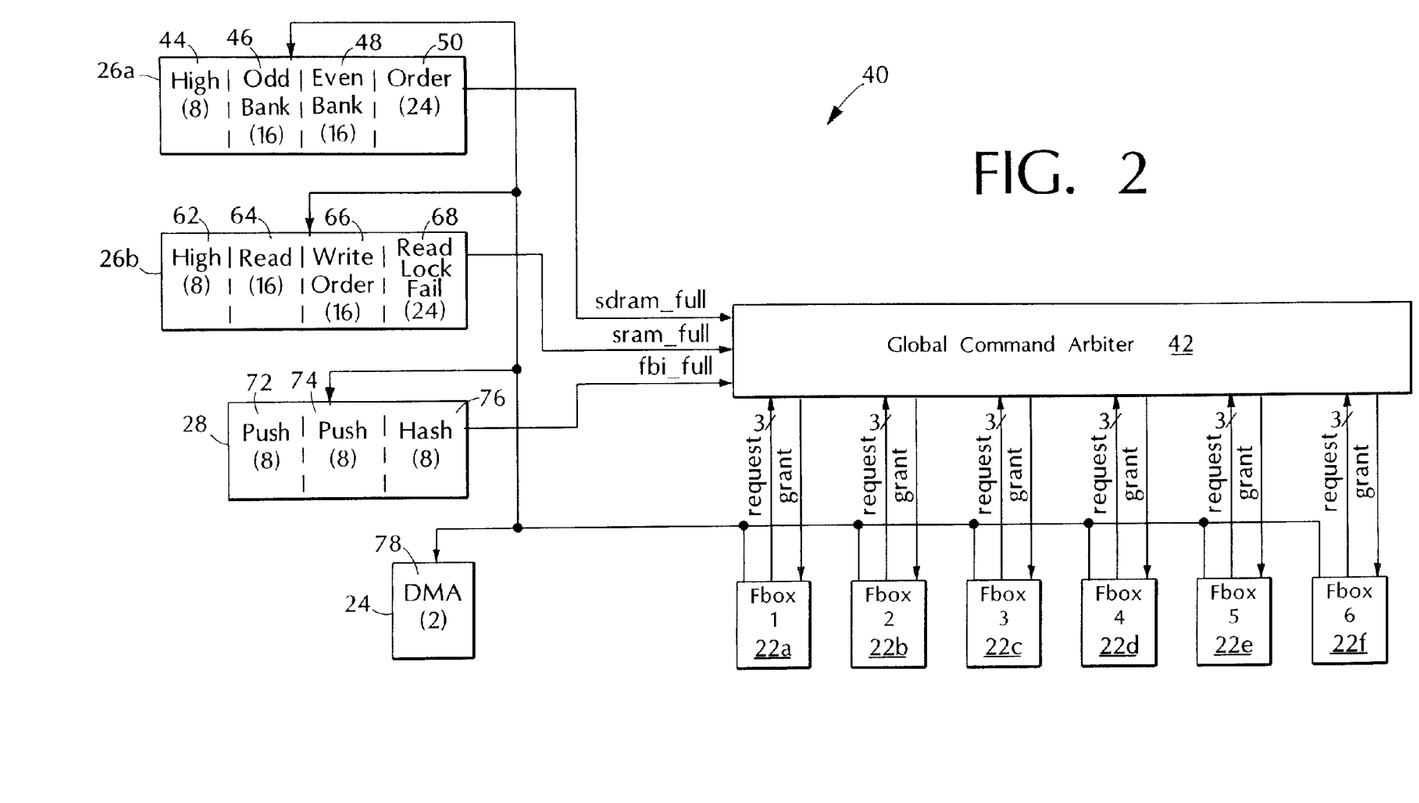
FIG. 2 is a simplified block diagram of a global arbitration system for a multithreaded process according to the invention.

FIG. 2 shows a global arbitration system 40 for use with the multithreaded processor 12 of FIG. 1. A global command arbiter 42 is connected to each of the microengines 22a–22f, to the SDRAM controller 26a, to the SRAM controller 26b, to the interface 28 and to the PCI interface 24. The global command arbiter 42 functions to provide high bandwidth access to the shared system resources utilizing a minimal amount of buffer storage elements and minimal wiring. The global command arbiter provides each microengine 22a–22f with fair access to the common system resources of the SDRAM, SRAM, PCI interface registers and FBUS interface registers based on command priority and resource utilization, which is explained below.

In an implementation, each microengine 22a–22f has a two-command deep first-in, first-out (FIFO) register for issuing command requests for SDRAM 16a and SRAM 16b memory access, and for issuing command requests for access to registers in the PCI interface 24 and FBUS interface 28. The SDRAM controller 26a queues commands from the microengines in one of four FIFO command queue structures: an eight-entry high-priority queue 44, a sixteen-entry odd bank queue 46, a sixteen-entry even bank queue 48, and a twenty-four entry maintain order queue 50. A single physical random access memory (RAM) structure with four input pointers and four output pointers may be used to implement the SDRAM queues 44, 46, 48, 50. A reference request from a microengine may include a bit set called the "optimized MEM bit" which,will be sorted into either the odd bank queue 46 or the even bank queue 48. If the memory reference request does not have a memory optimization bit set, the.default will be to go into the order queue 50. The order queue 50 maintains the order of reference requests from the microengines 22a–22f. With a series of odd and even banks references it may be required that a signal is returned to both the odd and even banks. If the microengine 22f sorts the memory references into odd bank and even bank references and one of the banks, for example the even bank, is drained of memory references before the odd bank but the signal is asserted on the last even reference, the SDRAM controller 26a could conceivably signal back to a microengine that the memory request had completed, even though the odd bank reference had not been serviced. This occurrence could cause a coherency problem. The situation is avoided by providing the order queue 50 which permits a microengine to have multiple memory references outstanding, of which only its last memory reference needs to signal a completion.

The SDRAM controller 26a also included a high priority queue 44. If an incoming memory reference from one of the microengines goes directly to the high priority queue then it is operated upon at a higher priority than other memory references in the other queues.

A feature of the SDRAM controller 26a is that when a memory reference is stored in the queues, in addition to the optimized MEM bit that may be set, a "chaining bit" may be set to require special handling of contiguous memory references. A microengine context may issue chained memory references when the second and/or third reference of the chain must be scheduled by the SDRAM controller 26a immediately after the initial chained memory request. The global command arbiter 42 must ensure that chained references are-delivered to consecutive locations of the same SDRAM controller queue.

The SRAM controller 26b also has four command queues: an eight-entry high priority queue 62, a sixteen-entry read queue 64, a sixteen-entry write order queue 66 and a twenty-four entry read-lock fail queue 68. A single physical RAM structure may be used to implement the four queues. The SRAM controller 26b is optimized based on the type of memory operation; i.e., a read or a write operation, and the predominant function that the SRAM performs is read operations.

The read lock fail queue 68 is used to hold read memory reference requests that fail because of a lock existing on a portion of memory. That is, one of the microengines issues a memory request that has a read lock request that is processed in an address and control queue. The memory request will operate on either the write order.queue 66 or the read queue 64 and will recognize it as a read lock request. The SRAM controller 26b will access a lock lookup device to determine whether this memory location is already locked. If this memory location is locked from any prior read lock request, then this memory lock request will fail and will be stored in the read lock fail queue 68. If it is unlocked or if the lock lookup device shows no lock on that address, then the address of that memory reference will be used by the SRAM interface 26b to perform a traditional SRAM address read/write request to SRAM memory 16b. A command controller and address generator will also enter the lock into the lock look up device so that subsequent read lock requests will find the memory location locked. A memory location is unlocked by clearing a valid bit in a content addressable memory (CAM) of the SRAM controller. After an unlock, the read lock fail queue 68 becomes the highest priority queue giving all queued read lock misses a chance to issue a memory lock request. The read-lock miss queue is loaded by the SRAM controller itself and not directly from a microengine output buffer. The global arbiter 42 ensures that a command from a microengine to a SRAM queue is not selected on the same cycle that the SRAM controller must write a read-lock miss entry.

The FBUS interface 28 includes three command queues: an eight-entry push queue 72, an eight-entry pull queue 74 and an eight-entry hash queue 76. The pull queue is used when data is moved from a microengine to an FBUS interface resource, the push queue is used for reading data from the FBUS interface to a microengine, and the hash queue is used for sending from one to three hash arguments to a polynomial hash unit within the FBUS interface and for getting the hash result returned. The FBUS interface 28 in a network application can perform header processing of incoming packets from the FBUS 18. A key function performed by the FBUS interface 28 is extraction of packet headers, and a hashed lookup of microprogrammable source/destination/protocol in SRAM memory 16b. If the hash does not successfully resolve, then the packet header is subjected to more sophisticated processing.

The PCI bus interface 24 includes a single, two-entry direct memory access (DMA) command register 78. The DMA register provides a completion signal to the initiating microengine thread.

The global command arbiter 42 operates to select commands from the two-deep output command queues of each microengine for transmission to a destination queue in one of the functional units. The functional units include the core controller 20, the PCI interface 24, the SDRAM controller 26a, the SRAM controller 26b, the FBUS interface 28 and the microengines 22a to 22f. Each microengine request to the global command arbiter 42 is a three-bit encoded field that specifies the command type and destination. Each microengine global command arbiter request is serviced with the following priority:

1. SDRAM chained commands
2. SRAM
3. SDRAM
4. FBUS
5. PCI bus

The global arbiter maintains a pointer that indicates the last microengine request granted. If more than one request is present at the same priority, the global command arbiter selects the next higher numbered microengine (with a wrap-around feature). For example, the microengines 22a to 22f may be numbered from 1 to 6 in an implementation so that if a request from microengine 6 was the last one granted, then.when priority is not an issue a request from microengine 1 is next up for consideration.

The three SRAM controller command queues 62, 64 and 66 are loaded directly from microengine commands. Since an SRAM command could be granted every cycle, it is possible that up to 6 additional SRAM commands will be granted and are in the pipeline, all of which could be destined for the same SRAM queue before a signal indicating that the queue is full is received by the global command arbiter. Thus, the SRAM controller asserts an SRAM_queue_full signal to the global command arbiter 42 if there is less than seven (7) empty entries in any SRAM command queue loaded from the microengines. For example, if the high, priority queue has two entries filled then the SRAM queue, full signal is asserted (because eight entries minus two entries is six). Similarly, if the read queue or the order queue contains ten entries then the SRAM_queue_full signal is asserted. This protocol is followed because a six cycle minimum latency exists from the assertion of a command request from a microengine and the command actually being stored in a destination queue.

The following diagram illustrates the timing of a request for a command destined for a queue in a system resource:

| 1 | 2 | 3 | 4 | 5 | 6 | 7 | 8 | 9 |
|---|---|---|---|---|---|---|---|---|
| Req | arb | gnt | bus | cmd | rcv | full | arb | NOGNT |
|  | req | arb | gnt | bus | cmd | rcv | full | arb |
|  |  | req | arb | gnt | bus | cmd | rcv | full |
|  |  |  | req | arb | gnt | bus | cmd | rcv |
|  |  |  |  | req | arb | gnt | bus | cmd |
|  |  |  |  |  | req | arb | gnt | bus |
|  |  |  |  |  |  | req | arb | NOGNT |

Where: req=bus request from the microengine;
arb=arbitrate requests;
gnt=drive grant to appropriate microengine;
bus=enable tri-state bus driver;
cmd=drive command onto fx_cmd_bus;
rcv=receiving box queues command;
full=full_status_que signal driven if necessary;
nognt=a grant is not sent to queues that sent "full" by cycle 7.

Referring to the above timing diagram, in the first cycle, a request is sent to the global command arbiter. In cycle two, arbitration is performed and in cycle three the request is granted to the requesting microengine. In cycle four, a bus is enabled and in cycle five the command is driven onto the bus. In cycle six the receiving unit (SDRAM controller, SRAM controller, PCI bus interface or FBUS interface) queues the command. In cycle seven a full_status_que command is driven if necessary (e.g. that queue contains less than a minimum number of available entry spaces). In cycle eight, the global command arbiter is deciding whether another request should be granted to that system resource, but sees that the full_status_queue signal was generated. The arbiter then acts to deny requests (nognt) to the queue which sent a full signal by the seventh cycle.

The FBUS interface 28 has 3 command queues (pull, hash, push) which all contain eight (8) entries. Commands to the FBUS interface are not granted in consecutive cycles. Thus, when any of the 3 FBUS interface queues reaches four (4) entries (instead of the two discussed above for an eight entry queue) a FBUS_queue_full signal is sent to the global command arbiter since only a maximum of 3 commands can be in transit to the FBUS interface queues prior to the global arbiter detecting FBUS_queue_full.

The SDRAM controller 26a has 4 command queues (high=8, even=16, odd=16, order=24). The threshold for asserting SDRAM_queue_full is the same as for the SRAM, i.e. less than 7 entries available in any queue. However, commands to the SDRAM controller are not granted on consecutive cycles. This insures queue entry space for any SDRAM chained commands from a particular microengine, which must be granted, even after SDRAM_queue_full asserts. It is necessary to always transfer SDRAM chained commands to avoid a live-lock condition, in which the SDRAM controller is waiting for the chained command in one queue while the command is "stuck" in a microengine because the global arbiter is no longer granting SDRAM commands since a different SDRAM queue is "full". A limit is placed on the chain length of SDRAM commands to three as a coding restriction. In addition, when a chained SDRAM command is granted to a microengine, the next SDRAM command to be granted must also come from the same microengine so that the paired commands arrive in the selected SDRAM queue contiguously.

The restrictions of not sending commands to the FBUS on consecutive cycles, and not sending commands to the SDRAM on consecutive cycles do not degrade system performance since each command requires many cycles to actually execute. The restriction is not placed on SRAM commands since the SRAM queue sizing is more than adequate, and more SRAM references requiring fewer cycles with lower latency are issued in most applications.

Figure 3A:
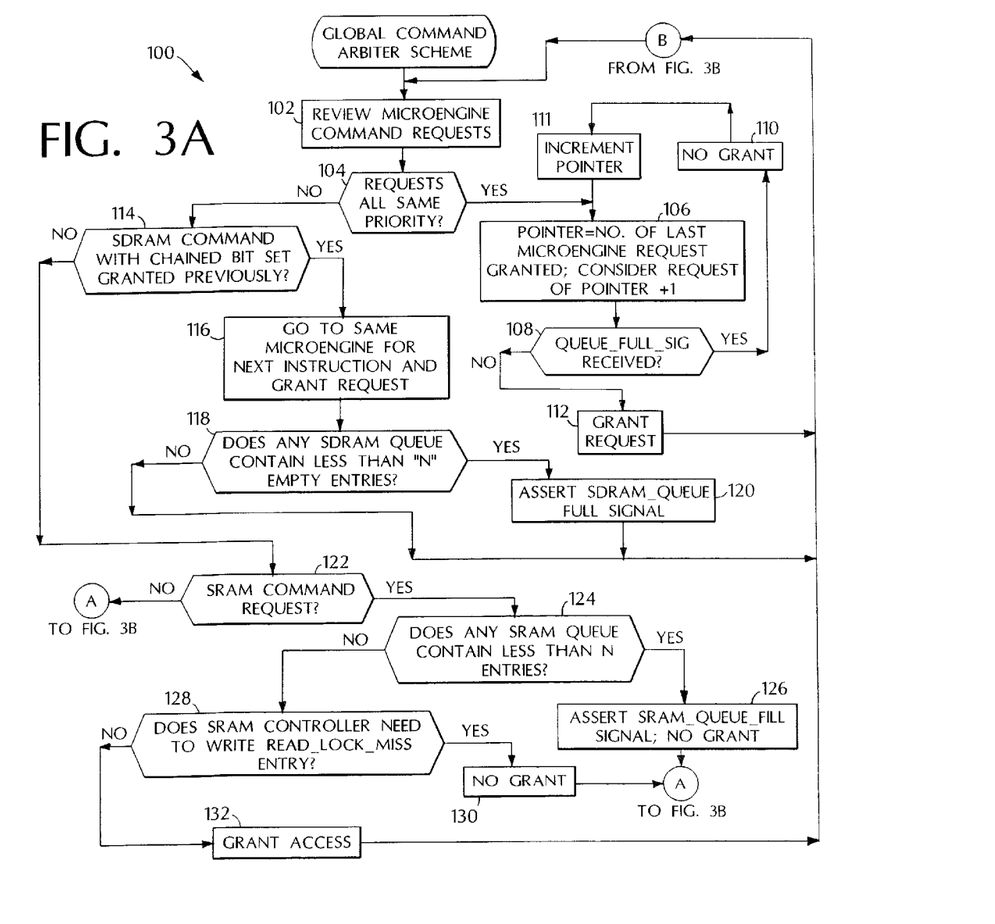
FIGS. 3A and 3B illustrate a flow chart of an implementation of a global command arbitration process according to the invention.
Figure 3B:
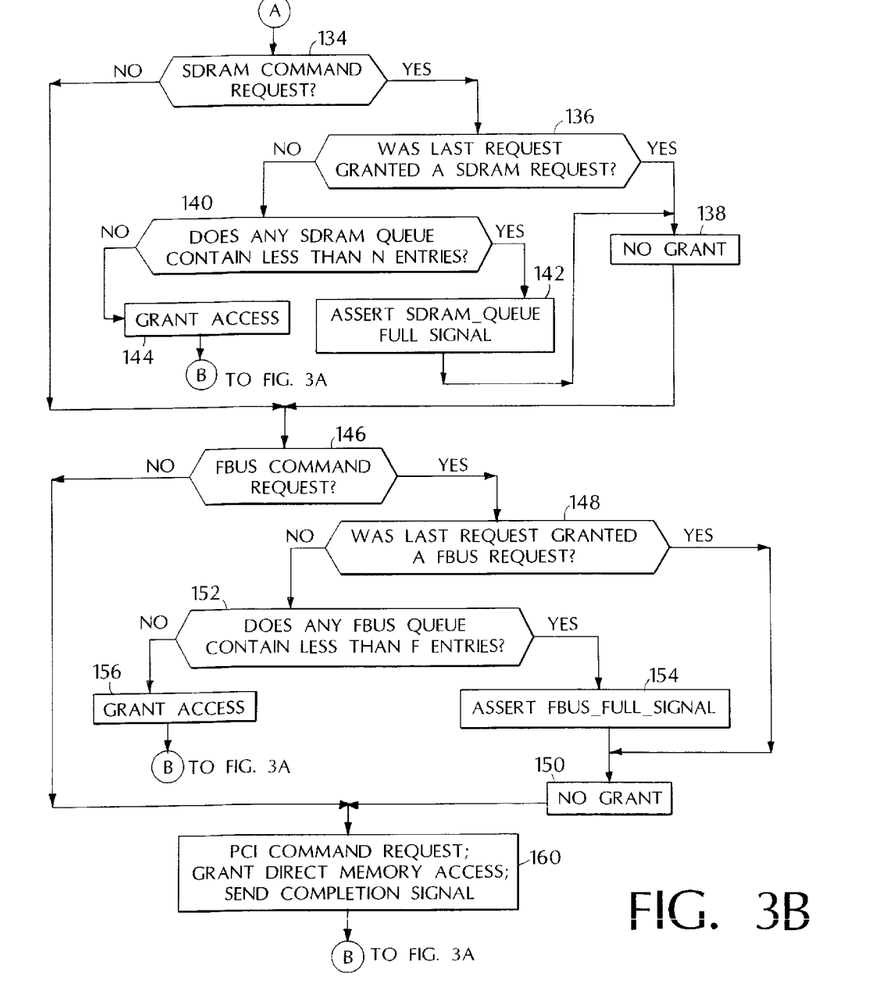

FIGS. 3A and 3B illustrate an implementation of a global command arbiter protocol process 100. The global command arbiter reviews 102 the command requests in the FIFO registers of the microengines 22a–22f. If all of the requests have the same priority 104, a pointer is checked 106 to determine the identity of the last microengine that had a request granted, and then the request of the next higher microengine is considered. Before granting the command request, the arbiter checks 108 to see if a queue_full_signal has been asserted. If so, the command request is denied 110 and the pointer is incremented 111 so that the next microengine's request will be considered. However, if no queue_full_signal has been asserted, then the command request is granted 112 and the flow returns to 102.

Referring again to step 104 of FIG. 3A, if the command requests in the microengines 22a to 22f have different priorities, then the global command arbiter checks 114 to see if a SDRAM request with a chained bit set has been granted previously. If so, then the SDRAM request from the same microengine that sent the previous SDRAM request with a chained bit is granted 116. Next, the SDRAM queues are checked 118 to determine if any contain less than "N" empty entries, where N is equal to the number of microengines plus one. In the implementation described above, the SDRAM_queue_full signal will be asserted 120 if any SDRAM queue contains less than seven (7) empty entries and then the flow returns to 102. If checking the queues 118 determines that the SDRAM queues have space for seven or more entries, then the flow returns to 102.

If there was no history of an SDRAM command request with a chained bit set 114, the global command arbiter determines 122 if there is a SRAM command request. If there is a SRAM request, the SRAM queues are checked 124 to see if any SRAM queue contains less than N empty entries. If so, then a SRAM_queue_full signal is asserted 126, the command request is denied and the flow moves to 134 where the arbiter determines if a SDRAM request has been made. However, if the answer 124 is no, then the arbiter checks 128 to see if the SRAM controller 26b needs to write a read_lock_miss entry. If so, then the command request is denied in step. 130 and the flow moves to 134; if not, then the command request is granted 132 and the flow returns to 102.

If the answer was no at 122, then the arbiter checks 134 (see FIG. 3B) to see if a SDRAM request is being made. If so, the arbiter determines 136 if the last granted request was also a SDRAM command request. If it was, then the request is denied 138 and the flow goes to 146 where the arbiter determines if an FBUS command request has been made. Commands. are not granted to the SDRAM controller in consecutive cycles to ensure that there is adequate queue entry space for a SDRAM chained command which is always granted when it occurs (even after a SDRAM_queue_full signal has been asserted). If the last granted command request was not an SDRAM command the SDRAM queues are checked 140 to see if any contains less than N entries. If so, then an SDRAM_queue_full signal is asserted 142, access is denied 138 and the flow moves to 146. If the SDRAM queues have adequate entry space, then the command request is granted 144 and the flow returns to 102.

If a SDRAM request is not being made 134, then the arbiter checks 146 to see if an FBUS command request has been made. If so, the arbiter checks 148 to see if the last granted request was a FBUS request. If so, then the request is denied 150 and the flow moves to 160 where the arbiter determines if a PCI command request has been made. Command requests to the FBUS are not granted in consecutive cycles to improve processing efficiency of the system. If the last granted request was not an FBUS command request 148, then the FBUS queues are checked 152 to see if any contain less than "F" empty entries. For the example.discussed above where there are six microengines and each of the FBUS command queues (pull, hash, push) contains eight entries, F equals five (5) since only a maximum of three (3) commands can be in transit to the FBI queues. Thus, if four or fewer entries are available in any FBUS queue, then the FBUS_queue_full signal is asserted 154, the command is denied 150 and the flow moves to 160. However, if the FBUS queues have adequate space, the request is granted 156 and the flow returns to 102.

If an FBUS request is not made 146, a PCI command request has been asserted 160. Direct memory access is granted and a completion signal is sent, then the flow returns to 102.

It is to be understood that while implementations of the invention have been described, the foregoing description is intended to illustrate and not limit the invention, which is defined by the scope of the appended claims. For example, the flow chart depicted in FIGS. 3A and 3B could be modified to accommodate more, less or different system resources. Other aspects, advantages, and modifications are within the scope of the following claims.

What is claimed is:

1. A parallel, multi-threaded processor system, comprising:
    a plurality of microengines, each including at least one command register;
    a plurality of system resource interface units connected to the microengines, each including at least one commands queue; and
    a global command arbiter including a pointer for storing the identity of the last microengine that had a request granted, the global command arbiter connected to each of the microengines and to the system resource interface units for determining whether a particular microengine command request should be granted.

2. The system of claim 1, further comprising a two-command deep FIFO commands register in each microengine.

3. The system of claim 1, wherein the system resource units include at least one of a core controller, a SDRAM controller, a SRAM controller, a PCI bus interface and an FBUS interface.

4. The system of claim 3, further comprising three command queues in at least one of the SDRAM controller, the SRAM controller and the FBUS interface.

5. The system of claim 3, further comprising a high priority queue in at least one of the SDRAM controller and the SRAM controller.

6. The system of claim 3, further comprising a read lock fail queue in the SRAM controller.

7. The system of claim 3, further comprising a single command register in the PCI bus interface.

8. A method for arbitrating command requests for access to shared system resources in a parallel, multi-threaded processor system, comprising:
    establishing a command request protocol based on the shared system resources and command types;
    selecting a command request from output command queues of a plurality of microengines according to a command priority which is part of the protocol;
    granting a microengine command request to a shared system resource destination queue if the protocol is satisfied; and
    denying a microengine command request if the protocol is not satisfied.

9. The method of claim 8, further comprising considering a command request of the next highest microengine if all command requests are of equal priority.

10. The method of claim 8, further comprising considering a command request of a lower priority when a microengine command request is denied.

11. The method of claim 8, further comprising giving top priority to a chained SDRAM command request.

12. The method of claim 11, further comprising giving the next highest priority to a SPAN command request.

13. The method of claim 12, further comprising giving the next highest priority to a non-chained SDRAM command request.

14. The method of claim 13, further comprising denying consecutive SDRAM command requests.

15. The method of claim 13, further comprising giving the next highest priority to a FBUS command request.

16. The method of claim 15, further comprising denying consecutive FBUS command requests.

17. The method of claim 15, further comprising giving the lowest priority to a PCI bus command request.

18. An article comprising a computer-readable medium which stores computer executable instructions for arbitrating command requests for shared system resources in a parallel, multi-threaded system, the instructions causing a computer to:
    establish a command request protocol based on the shared system resources and command types;
    select a command request from output command queues of a plurality of microengines according to a command priority which is part of the protocol;
    grant a microengine command request to a shared system resource destination queue if the protocol is satisfied; and
    deny a microengine command request if the protocol is not satisfied.

19. The article of claim 18, the instructions further causing a computer to consider a command request of the next highest microengine if all command requests are of equal priority.

20. The article of claim 18, the instructions further causing a computer to consider a command request of a lower priority when a microengine command request is denied.

21. The article of claim 18, the instructions further causing a computer to assign top priority to chained SDRAM command requests.

22. The article of claim 21, the instructions further causing a computer to assign the next highest priority to SRAM command requests.

23. The article of claim 22, the instructions further causing a computer to assign the next highest priority to non-chained SDRAM command requests.

24. The article of claim 23, the instructions further causing a computer to deny consecutive SDRAM command requests.

25. The article of claim 23, the instructions further causing a computer to assign the next highest priority to FBUS command requests.

26. The article of claim 25, the instructions further causing a computer to deny consecutive FBUS command requests.

27. The article of claim 25, the instructions further causing a computer to assign the lowest priority to PCI bus command requests.

28. A method for arbitrating command requests for access to shared system resources, in a parallel, multi-threaded processor system, comprising:

arbitrating command requests of a plurality of microengines based on a command protocol;

granting a command request for transmission to a queue in a system resource;

storing the command in the queue of the system resource;

generating a full status queue signal if there are less than an adequate number of spaces available to store further commands in the queue; and denying further command requests for storage in that queue if the full status queue signal was generated.

29. The method of claim 28, further comprising establishing a command protocol that gives highest priority to chained SDRAM command requests.

30. The method of claim 29, further comprising establishing the next highest priorities in the order of SRAM command requests, non-chained SDRAM command requests, FBUS command requests and PCI bus command requests.

31. The method of claim 28, further comprising establishing a command protocol that considers a command request of a lower priority when a microengine command request is denied.

32. An article comprising a computer-readable medium which stores computer executable instructions for arbitrating command request for access to shared system resources in a parallel, multi-threaded processor system, the instructions causing a computer to:

arbitrate command requests of a plurality of microengines based on a command protocol;

grant a command request for transmission to a queue in a system resource;

store the command in the queue of the system resource;

a full status queue signal if there are less than an adequate number of spaces available to store further commands in the queue; and deny further command requests for storage in that queue if the full status queue signal was generated.

33. The article of claim 32, the instructions further causing a computer to establish a command protocol that gives highest priority to chained SDRAM command requests.

34. The article of claim 32, the instructions further causing a computer to establish the next highest priorities in the order of SRAM command requests, non-chained SDRAM command requests, FBUS command requests and PCI bus command requests.

35. The article of claim 32, the instructions further causing a computer to establish a command protocol that considers a command request of a lower priority when a microengine command request is denied.

* * * * *